United States Patent
Mizuno et al.

(10) Patent No.: US 6,401,006 B1
(45) Date of Patent: Jun. 4, 2002

(54) MACHINE CONTROLLER WITH PRIMARY AND SECONDARY INTERPOLATION

(75) Inventors: Tohru Mizuno, Tama; Toshiaki Otsuki, Hino; Shouichi Sagara; Yasuhiro Saito, both of Yamanashi, all of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/191,127

(22) Filed: Nov. 13, 1998

(30) Foreign Application Priority Data

Nov. 14, 1997 (JP) .............................. 9-329744

(51) Int. Cl.⁷ .................. G05F 19/00; G05B 19/41; G05B 19/25
(52) U.S. Cl. .................. 700/189; 700/170; 700/187; 700/188; 318/568.15; 318/573
(58) Field of Search .............. 700/189, 188, 700/187, 186, 170, 252; 318/568.15, 570, 573

(56) References Cited

U.S. PATENT DOCUMENTS

| | | | | |
|---|---|---|---|---|
| 4,061,907 A | * | 12/1977 | Okamoto et al. | 708/270 |
| 4,554,497 A | * | 11/1985 | Nozawa et al. | 318/636 |
| 4,903,213 A | * | 2/1990 | Buhler et al. | 700/189 |
| 5,229,698 A | * | 7/1993 | Minnich et al. | 318/568.15 |
| 5,508,596 A | | 4/1996 | Olsen | 318/569 |
| 5,723,962 A | * | 3/1998 | Mizukami et al. | 318/571 |
| 5,825,654 A | | 10/1998 | Speth et al. | 700/188 |
| 6,225,772 B1 | * | 5/2001 | Aizawa et al. | 318/571 |

FOREIGN PATENT DOCUMENTS

| | | |
|---|---|---|
| DE | 96 10221 | 4/1996 |
| EP | 419 670 | 4/1991 |
| EP | 439 617 | 8/1991 |
| EP | 795 804 | 9/1997 |
| EP | 0 917 033 A2 * | 5/1999 |
| JP | 62-204312 | 9/1987 |
| JP | 1-99102 | 4/1989 |
| JP | 1-217608 | 8/1989 |
| JP | 1-234903 | 9/1989 |
| JP | 2-113305 | 4/1990 |
| JP | 2-162402 | 6/1990 |
| JP | 4-131913 | 5/1992 |
| JP | 6-180606 | 6/1994 |
| JP | 9-244725 | 9/1997 |

* cited by examiner

*Primary Examiner*—Leo P. Picard
*Assistant Examiner*—Paul Rodriguez
(74) *Attorney, Agent, or Firm*—Staas & Halsey LLP

(57) ABSTRACT

A controller to smoothly change speed of a machining tool to improve machining accuracy and speed of a machine. The controller includes a command analyzing section included in a block structure of software that analyzes a command program and converts it to data appropriate for use in a primary interpolation section. The primary interpolation section performs interpolation calculation in each first sampling period to obtain an interpolation point on a commanded path, and outputs the obtained interpolation point to an intermediate memory. The intermediate memory stores a motion amount for each axis, a feed rate and a block length. An acceleration/deceleration control section performs acceleration/deceleration control based on the data stored in the intermediate memory, and calculates speed in each second sampling period which is shorter than the first sampling period, to output the calculated speed to a secondary interpolation section. The secondary interpolation section defines a smooth curve expressed, for example, by a polynomial based on output from the acceleration/deceleration control section and the data in the intermediate memory, to output an interpolation point on the smooth curve in each second sampling period.

11 Claims, 8 Drawing Sheets

MACHINE CONTROLLER WITH PRIMARY AND SECONDARY INTERPOLATION

BACKGROUND OF THE INVENTION

1. Field of the Invention

The present invention relates to a controller for controlling a machine such as a general machine tool, a laser beam machine or a plasma machine in which respective axes are driven by servomotors, and more specifically to a technique for improving machining accuracy and machining speed of the machine controlled by the controller.

2. Description of the Related Art

In a machine tool, a laser beam machine or a plasma machine, a machining tool of various kinds (for example, a cutting tool, a drilling tool, a laser beam nozzle or a plasma torch) is attached to a machining head and respective axes for moving the machining head or a working table which moves relatively to the machining head are driven by servomotors.

The servomotor for each axis is controlled by a servo control section (including a servo CPU and a servo amplifier) provided for each axis. Each servo control section controls the servomotor based on a motion command outputted for each axis from the controller of the machine, and a position and speed feedback signals from a pulse encoder provided for each servomotor or axis.

The controller reads a program in which a motion path of the machining tool is specified, and performs an interpolation calculation to determine a plurality of interpolation points along the motion path by software processing. With respect to the interpolation calculation, there is known a method in which interpolation calculation is divided into two stages. The two stages are respectively called a primary interpolation and a secondary interpolation. In the primary interpolation, interpolation points are defined on the motion path in a predetermined sampling period (first sampling period). The secondary interpolation further interpolates the interpolation points defined by the primary interpolation. According to the conventional method, the secondary interpolation is performed on a straight line connecting the interpolation points defined by the primary interpolation.

In FIG. 1, interpolation points obtained by the secondary interpolation according to the conventional method are exemplified in a case where the primary interpolation is a circular interpolation (a motion path A designated by a program is circular). In FIG. 1, points P0, P1, P2 and P3 represent interpolation points determined by the primary interpolation. Those interpolation points are determined along the circular motion path. In the conventional method of the secondary interpolation to be performed subsequently to the primary interpolation, a linear interpolation is performed in the sections P0P1, P1P2 and P2P3 defined by the interpolation points P0, P1, P2, P3 obtained as the outputs of the primary interpolation. Points Q1 to Q23 represent interpolation points outputted in the secondary interpolation according to the conventional method.

As is understood from the example of FIG. 1, when the secondary interpolation is performed as linear interpolation, speed of each axis changes abruptly in the vicinity of the interpolation points P0, P1, P2, P3 defined by the primary interpolation. Since the speed does not change smoothly, a problem such as deterioration in surface roughness of a machined surface arises in an actual machining.

Further, since the secondary interpolation is performed based on speed data derived from the output of the primary interpolation, speed changes abruptly at the time of starting and stopping of the motion or passing a point where a feed rate changes. FIG. 2 is a diagram for explaining the above, in which an example of feed rate of a Y axis is shown in the case where a motion command for each of X, Y and Z axes is outputted based on the output of the secondary interpolation in the conventional method. The direction of the Y axis corresponds to the direction of Y axis of a coordinate system shown in FIG. 1 (the Z axis is perpendicular to a plane of the sheet of FIG. 1.)

In FIG. 2, the feed rate in sections Q0Q1, Q1Q2, Q2Q3, ..., Q21Q22, Q22Q23 is shown as a bar graph divided into twenty three value areas. In the example of FIG. 1, since a sequence of points outputted by the secondary interpolation aligns on three straight-line sections connected to form a polygonal line, the feed rate in the Y-axis direction changes abruptly in the vicinity of the points P0, P1, P2 and P3. When speed in a section Qi–1Qi (i=1, 2, 3, ..., 23) is represented by Qi, the feed rate abruptly changes 0→q1 at the time starting of motion from P0; q7→q8 and q8→q9 before and after passing the point P1; q15→q16 and q16→q17 before and after passing the point P2; and P23→0 at the time of stopping.

When left as it is, the feed rate of each axis does not change smoothly. Therefore, acceleration/deceleration processing is generally performed on speed data for each axis after the secondary interpolation in order to ensure that the feed rate changes smoothly. However, when each axis is controlled by the acceleration/deceleration processing on the speed data, a path error is produced such that the resulting path for the machining tool deviates inwards from the commanded path. In the example shown in FIGS. 1 and 2, the resulting path will be a path B as shown in FIG. 3 with respect to the motion path A specified by the program.

The above described problems (abrupt change of the feed rate and a path error by the acceleration/deceleration control) are conspicuous especially when the machining speed is high. Therefore, in the controller which performs the two-stage interpolation in conventional method, these problems hinder not only improvement of machining accuracy but also increase of machining speed.

SUMMARY OF THE INVENTION

An object of the present invention is to solve the above problems in a controller (having a function of a numerical control) for controlling a machine tool of each kind, a laser beam machine, a plasma machine or the like, so as to contribute improvement of machining accuracy and increase of machining speed of the machine controlled by the controller.

In the present invention, the secondary interpolation is not performed to form a straight line but performed to form a smooth curve in the two-stage interpolation of the primary and secondary interpolations by software processing means included in the controller. Further, in the secondary interpolation processing, acceleration/deceleration control of speed in the tangential direction is performed to thereby restrain a path error and to effect smooth change of speed.

Specifically, according to the present invention, since the secondary interpolation of the two-stage interpolation is not performed on a straight line but performed on a smooth curve, change of speed on each axis is smooth. Further, since the acceleration/deceleration control is performed so that speed in the tangential direction changes smoothly, change of speed is smooth even at the time of starting and stopping of the motion or passing a point where feed rate changes.

In a preferred embodiment of the invention, a command analyzing section, a primary interpolation section, a secondary interpolation section, an intermediate memory and an acceleration/deceleration control section are provided in the controller.

The command analyzing section analyzes a program and converts the program to data for the primary interpolation section. The first interpolating section performs interpolation calculation in each first sampling period to obtain an interpolation point on a commanded path, and outputs the obtained interpolation point to the intermediate memory. The acceleration/deceleration control section performs acceleration/deceleration control based on the data stored in the intermediate memory, and calculates speed in each second sampling period. The secondary interpolation section defines a smooth curve based on output from the acceleration/deceleration control section and the data derived from the intermediate memory, and outputs an interpolation point on the smooth curve in each second sampling period.

DETAILED DESCRIPTION OF THE PREFERRED EMBODIMENTS

Figure 4:
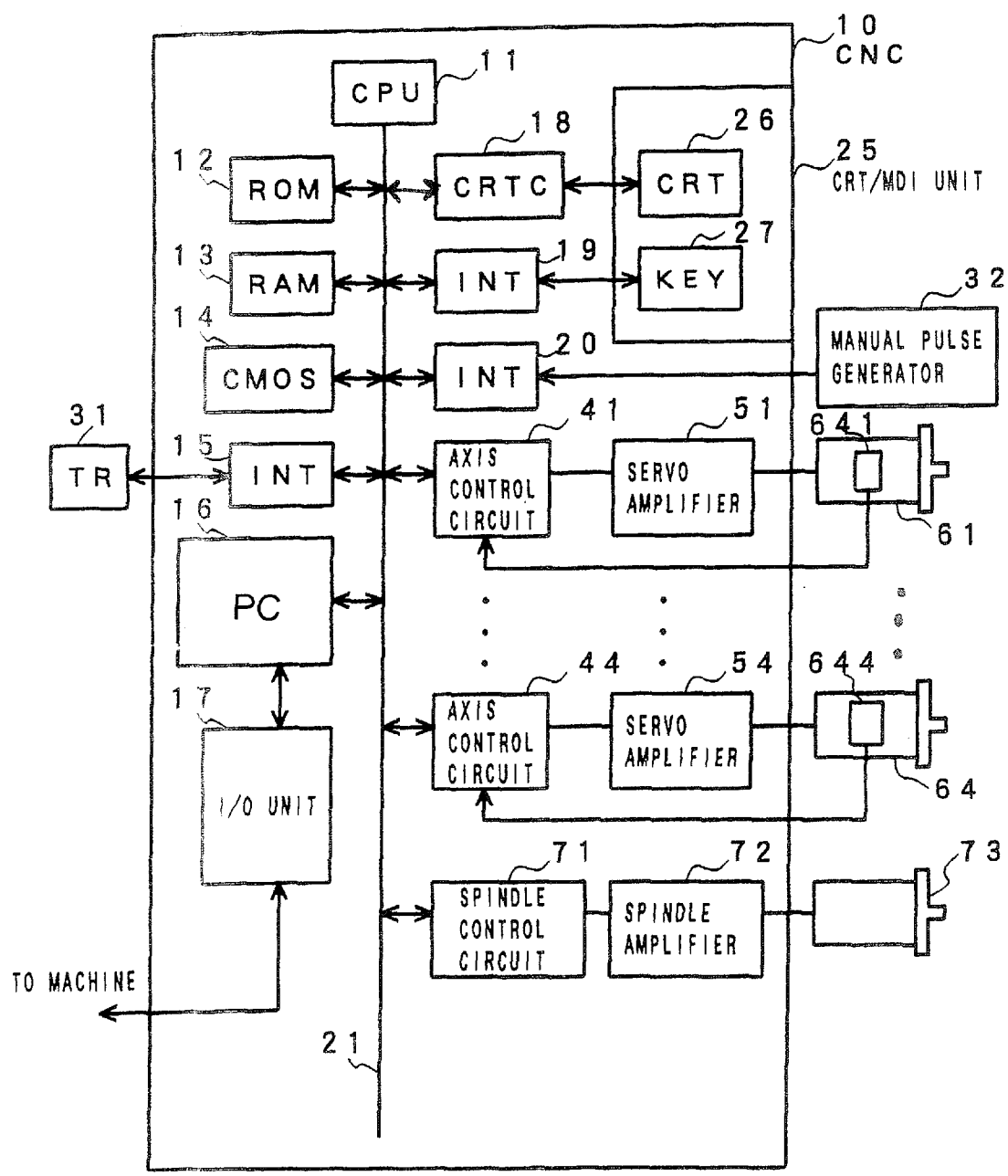
FIG. 4 is a block diagram schematically showing a hardware structure of a controller for a machine according to an embodiment of the invention.

FIG. 4 shows an example of a hardware structure of a controller of a machine according to the present invention. In FIG. 4, a processor 11 of a controller 10 reads a system program stored in a ROM 12 via a bus 21 and performs a general control of the controller 10 in accordance with the system program. A RAM 13 in the form of DRAM, etc. temporarily stores calculation data, display data and the like.

A CMOS 14 stores the operation program and various parameters. The data stored in the CMOS 14 includes a software (programs and related parameters) for two-stage interpolation processing, as described later.

The CMOS 14 is backed up by a battery (not shown) and functions as a non-volatile memory in which stored data is not deleted even when a power supply for the controller 10 is shut down.

An interface 15 is provided for input/output between the controller 10 and an external device. An external device 31 such as an offline programming device or a printer is connected to the interface 15. When a machining program is prepared by an offline programming device, the prepared data is inputted through the interface 15 to the controller 10. Data on a machining program edited by the controller 10 can be outputted by a printer.

A PC (programmable controller) 16 is provided within the controller 10 and controls a machine in accordance with sequence programs in a ladder form. Specifically, the PC 16 converts commands to necessary signals by the sequence programs, and outputs the signals through an I/O unit 17 to the machine (in this example, a machine having four axes (the above-described three axes, X axis, Y axis, Z axis, and a turning axis, A axis ) according to M functions (miscellaneous functions), S functions (spindle speed functions) and T functions (tool functions) specified in machining programs. The outputted signals operate various actuating portions (air cylinders, screws, electric actuators, etc.) in the machine. Further, the PC 16 receives signals from various switches on the machine and an operation panel to perform the necessary processing on the signals and transmits them to the processor 11.

A graphic control circuit 18 converts digital data such as current position data of each axis (each of the four axes), an alarm, parameters and image data to graphic signals, and outputs the graphic signals. The graphic signals are transmitted to a display device 26 in a CRT/MDI unit 25 and displayed on the display device 26. An interface 19 receives data from a keyboard 27 of the CRT/MDI unit 25, and transmit the data to the processor An interface 20 is connected to a manual pulse generator 32 and receives a pulse from the manual pulse generator 32. The manual pulse generator 32 is mounted on the machine operation panel, and used for manually moving/positioning movable parts of the machine including a working table.

Axis control circuits 41 to 44 receive to process motion commands for the individual axes from the processor 11 and output the commands to servo amplifiers 51 to 54. The servo amplifiers 51 to 54 drive servomotors 61 to 64 for the individual axes in accordance with the motion commands. The servomotors 61 to 64 for the individual axes drive three basic axes (X axis, Y axis, Z axis) and a turning axis (A axis) of the machine. In this example, the A axis is provided for adjusting an orientation of the working table. Features of the present invention are applied in operation of the three basic axes (X axis, Y axis, Z axis).

Reference numeral 644 denotes a pulse coder as a position detector provided in the servomotor 64 for driving the A axis. Pulse coders are provided in the servomotors for the other axes in the same way. Pulses outputted from the pulse coders are used as position feedback signals and speed feedback signals.

A spindle control circuit 71 receives a spindle rotation command and outputs a spindle speed signal to a spindle amplifier 72. Receiving the spindle speed signal, the spindle amplifier 72 makes a spindle motor 73 rotate at the specified rotation speed to thereby operate the machining tool of the machine. In the case where the machine is a laser beam machine or a plasma machine, the above mentioned components related to the spindle are not necessary, and known components for controlling a laser beam generator or a plasma torch is added instead.

Thus, the hardware structure and the basic function of the controller of the present invention are not particularly different from those of a conventional numerical controller and the present invention does not require any special modification of the hardware structure or the basic function.

Hereinafter, the technique for performing the two-stage interpolation and acceleration/deceleration control by software processing in the controller having the above hardware structure will be explained. The block structure of the controller 10 in the embodiment is illustrated in FIG. 5 from a view point of software processing.

Figure 5:
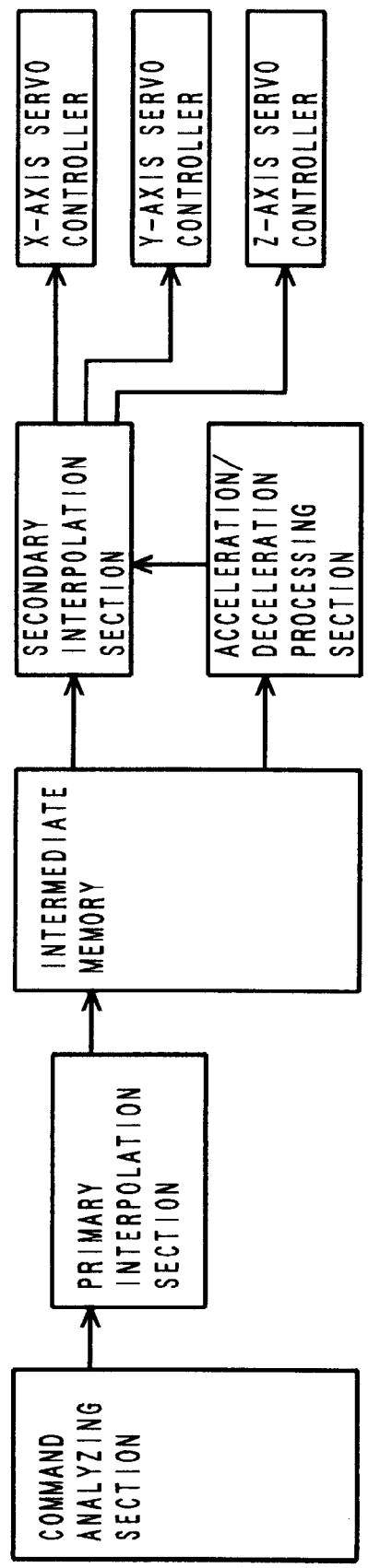
FIG. 5 is a diagram showing block structure of the controller according to the embodiment from a view point of software processing.

In FIG. 5, a command analyzing section analyzes a command program and converts the program to data which is appropriate for use in a primary interpolation section. The primary interpolation section executes interpolation calculation in every first sampling period to obtain an interpolation point on a commanded path, and outputs the obtained interpolation point to an intermediate memory. Data stored in the intermediate memory includes a motion amount of each axis, a feed rate and a block length.

An acceleration/deceleration control section performs acceleration/deceleration control based on the data in the intermediate memory to calculate speed in every second sampling period and outputs the calculated speed to a secondary interpolation section. The secondary interpolation section defines a smooth curve based on the output from the acceleration/deceleration control section and the data stored in the intermediate memory, and outputs a point on the smooth curve in every second sampling period. The second sampling period is determined to be shorter than the first sampling period. For example, the first sampling period is 8 ms and the second sampling period is 1 ms.

Figure 6:
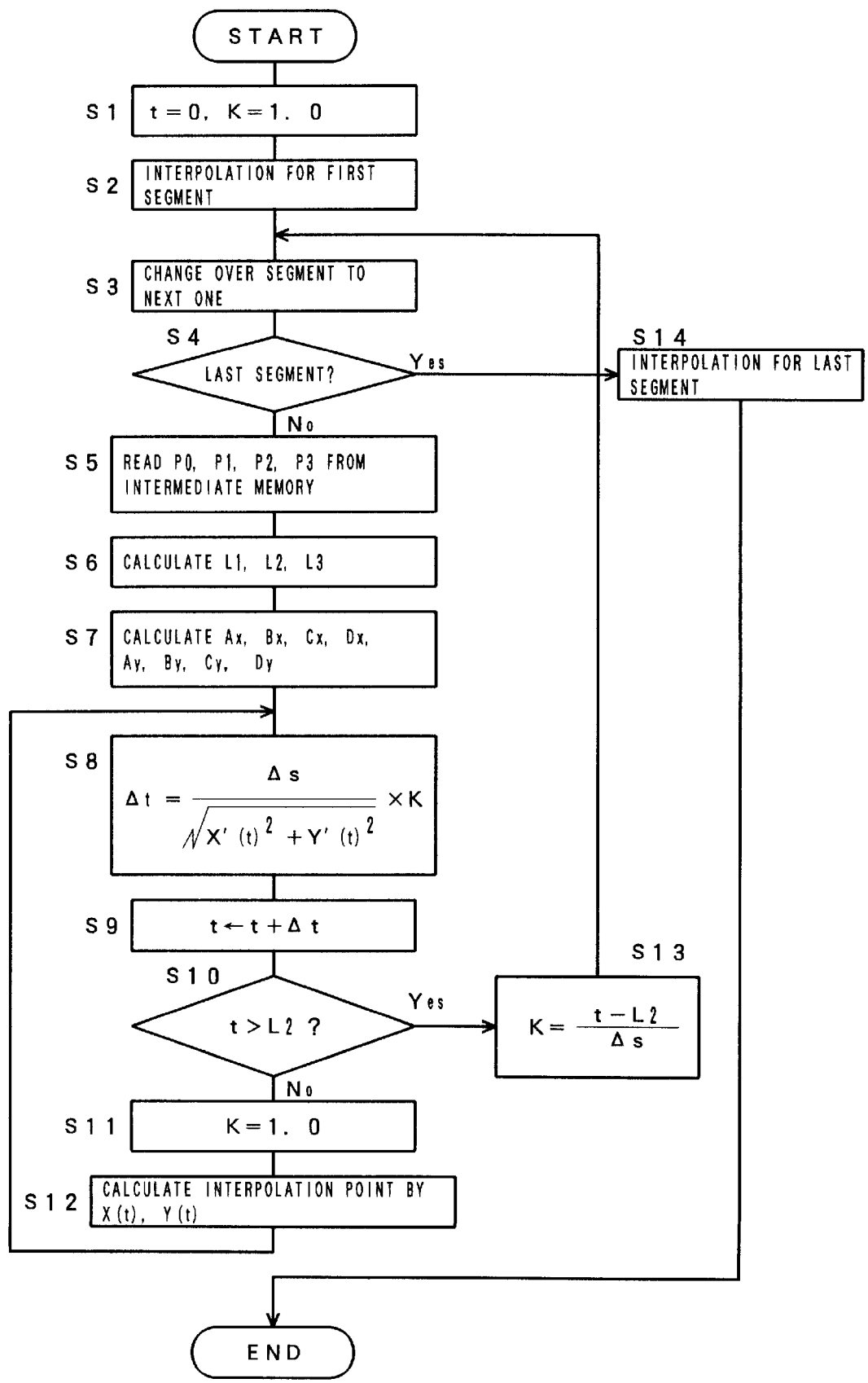
FIG. 6 is a flowchart schematically showing processing for a smooth secondary interpolation using equations of third degree in the embodiment.

Various ways of interpolation can be adopted for the smooth interpolation by the secondary interpolation section. An embodiment will be explained with respect to processing shown in a flowchart of FIG. 6. Here, in order to simplify the explanation, a way of interpolation using an equation of third degree which represents an algebraic curve passing through primary interpolation points will be explained. In the following example, calculation is performed only for two axes, i.e., the X and Y axes, but the same principle can be applied to an arbitrary number of axes. A section between one primary interpolation point and the adjacent primary interpolation point to be subjected to the curved interpolation will be called "segment". Definitions of signs used in the flowchart are as follows:

- P0: a primary interpolation point immediately before a start point of a segment for which interpolation is to be performed
- P1: a start point of the segment for which interpolation is to be performed
- P2: an end point of the segment for which interpolation is to be performed
- P3: a primary interpolation point immediately after the end point of the segment for which interpolation is to be performed
- L1: a distance between P0 and P1
- L2: a distance between P1 and P2
- L3: a distance between P2 and P3
- Δs: a speed in a tangential direction (motion amount per the secondary sampling period) outputted from the acceleration/deceleration processing section
- K: a coefficient indicating a proportion of a motion amount which has not been outputted when segments are changed over.

Coordinates of an interpolation point within a segment is calculated using the following equations. A time parameter t takes values −L1, 0, L2 and (L2+L3) at the points P0, P1, P2 and P3, respectively, and the coefficients Ax, Bx, Cx, Dx, Ay, By, Cy and Dy are determined on the condition that the coordinates X(t), Y(t) take values of coordinates of points P0, P1, P2 and P3 at −L1, 0, L2 and (L2+L3), respectively. Secondary interpolation points within the segment P1P2 can be obtained by changing t in the following equation in the range of $0 \leq t \leq L2$.

$$X(t) = Axt^3 + Bxt^2 + Cxt + Dx$$

$$Y(t) = Ayt^3 + Byt^2 + Cyt + Dy$$

X'(t) and Y'(t) respectively represent differentials of X(t) and Y(t) with respect to t. Essentials of processing in each step are as follows:

[Step S1]: t and K are initialized. Since K is a coefficient indicating a proportion of a motion amount which has not been outputted when segments are changed over, K is set to be 1.0 except when segments are changed over.

[Step S2]: Interpolation of the first segment is performed. Since there exists no primary interpolation point before the first segment, a different mode of interpolation from that explained in Step S3 and succeeding Steps of the flowchart is performed for the first segment. Details of this mode of interpolation will be omitted.

[Step S3]: Segment for which interpolation is to be performed is changed over to a next one.

[Step S4]: Whether the segment for which interpolation is currently performed is the last segment or not is judged. If it is judged to be the last segment, the procedure proceeds to Step S14 (interpolation for the last segment). If not, the procedure proceeds to Step S5.

[Steps S5 to S7]: Coordinates of P0, P1, P2 and P3 are read from the intermediate memory. Lengths L1, L2, L3 of segments are obtained and coefficients Ax, Bx, Cx, Dx, Ay, By, Cy and Dy in the equations X(t) and Y(t) are obtained.

[Step S8]: An increment Δt of time t is obtained based on a motion amount Δs per the second sampling period, which is calculated by the acceleration/deceleration processing section, primary differentiated values X'(t) and Y'(t) of X(t) and Y(t), and K.

[Step S9]: The increment Δt is added to t.

[Step S10]: t and L2 are compared. If t>L2, it is judged that the segment need to be changed over to a next one and the procedure proceeds to Step S13 (calculation of the proportion K of a distance to be outputted in the next segment). If t≦L2, it is judged that the secondary interpolation is still in the same segment, and the procedure proceeds to Step S11.

[Step S11]: K is set to be 1.0.

[Step S12]: A secondary interpolation point is calculated using the equations X(t) and Y(t), and the procedure returns to Step S8.

[Step S13]: The proportion K of a distance to be outputted in the next segment is calculated.

[Step S14]: Interpolation of the last segment is performed. Since there exists no primary interpolation point after the last segment, a different mode of interpolation from that explained in Step S3 and succeeding Steps of the flowchart is performed, as in the case of the interpolation for the first segment. Details of this mode of interpolation will be omitted.

Figure 1:
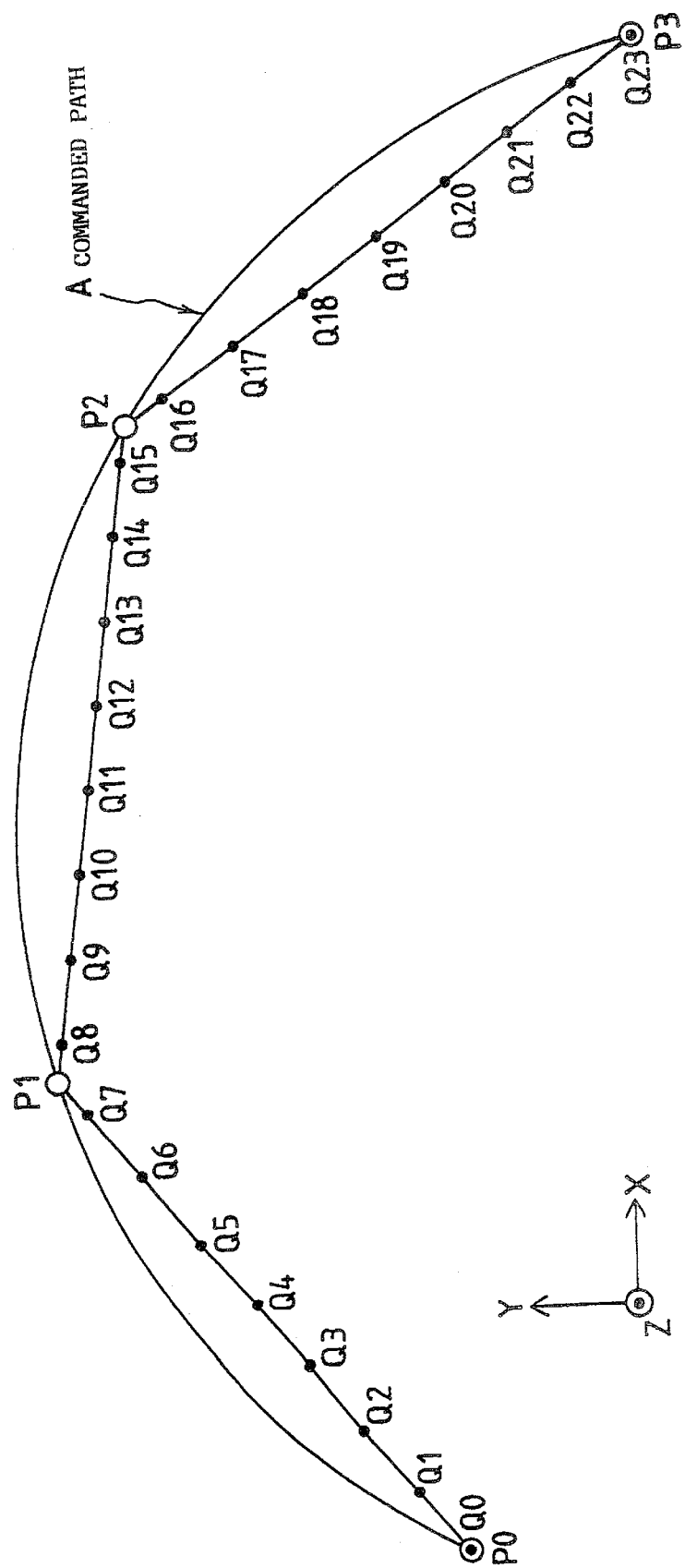
FIG. 1 is a diagram showing interpolation points for explanation of secondary interpolation according to a conventional method in the case where primary interpolation is circular interpolation (a motion path A specified by a program is circular)
Figure 7:
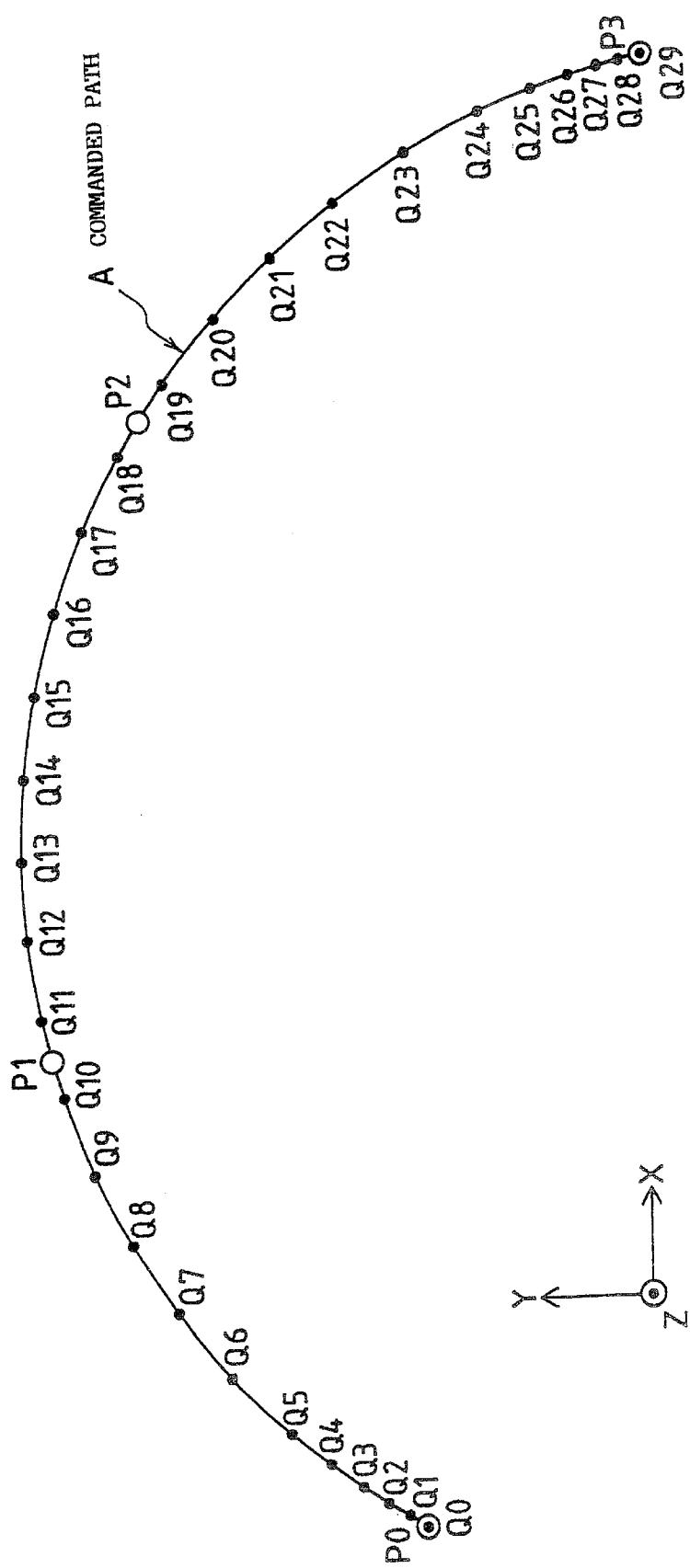
FIG. 7 is a diagram showing interpolation points obtained in the embodiment in the same manner as in FIG. 1.

FIG. 7 shows interpolation points defined in the above embodiment in the same manner as in FIG. 1. In FIG. 7, P1 to P3 are interpolation points outputted from the primary interpolation section, and Q0 to Q29 are interpolation points outputted from the secondary interpolation section. As seen from FIG. 7, an actual moving path is made very close to a commanded path by performing the interpolation of smooth curve (in this example, a curve of third order).

In the above example, in order to simplify the explanation, the description has been made on the case where interpolation is performed using an equation of third degree whose algebraic curve passes through four primary interpolation points. In other ways of curve interpolation, various curves such as a spline curve, a Bezier curve, and a B spline curve which are so calculated that a primary differentiated vector and a secondary differentiated vector may be continuous can be used. Since the techniques of those curve interpolations themselves are known, detailed explanation of each of them will be omitted.

Figure 2:
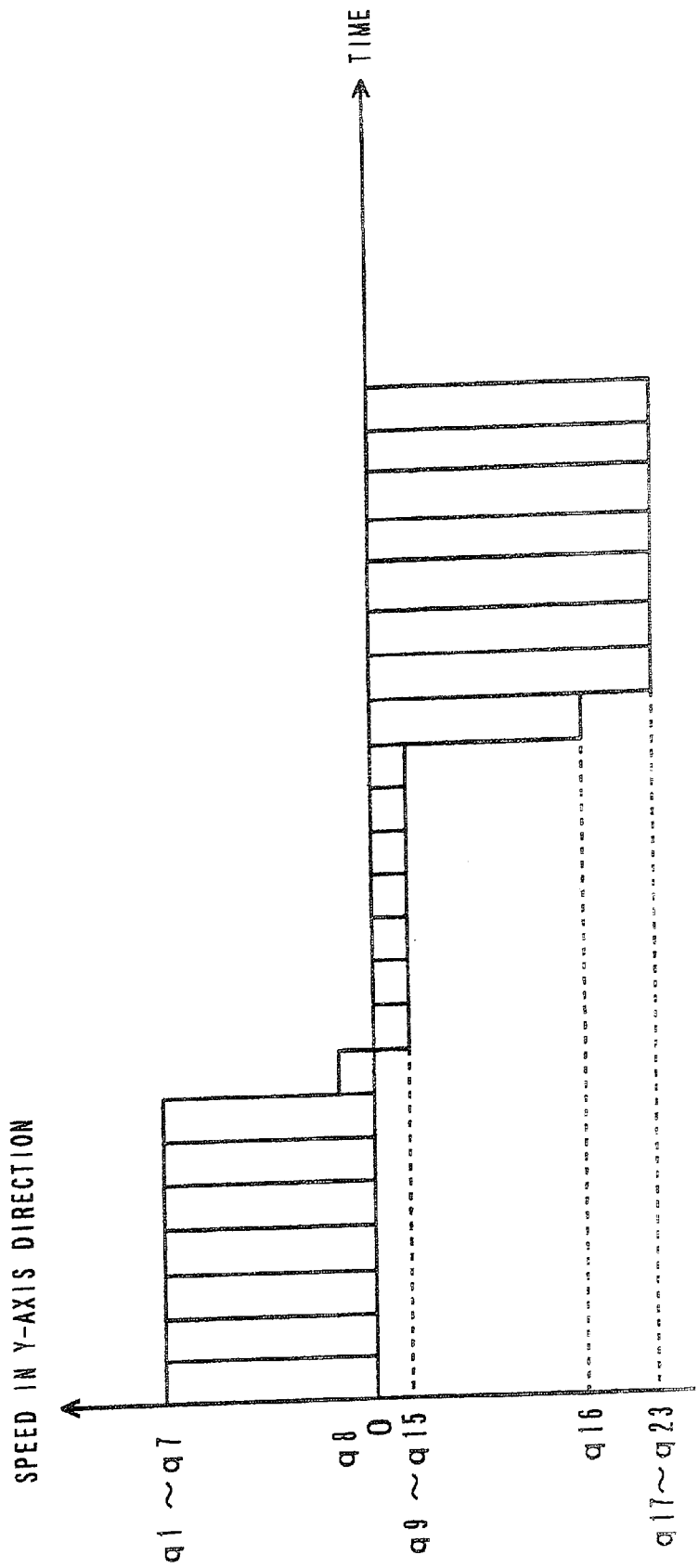
FIG. 2 is a diagram for showing change of speed in the conventional method.
Figure 3:
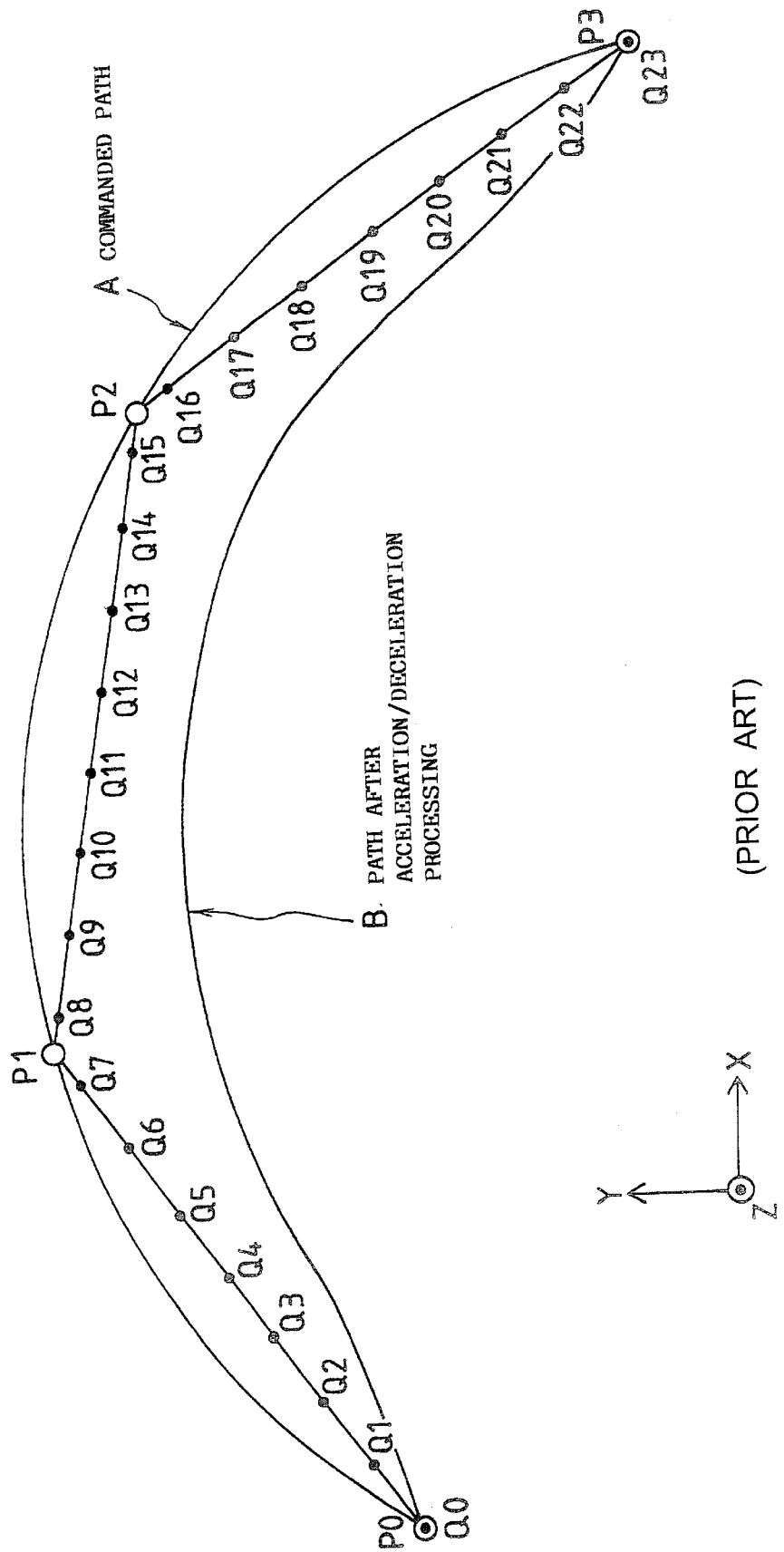
FIG. 3 shows a resulting path B with respect to a motion path A specified by a machining program in the example shown in FIGS. 1 and 2.
Figure 8:
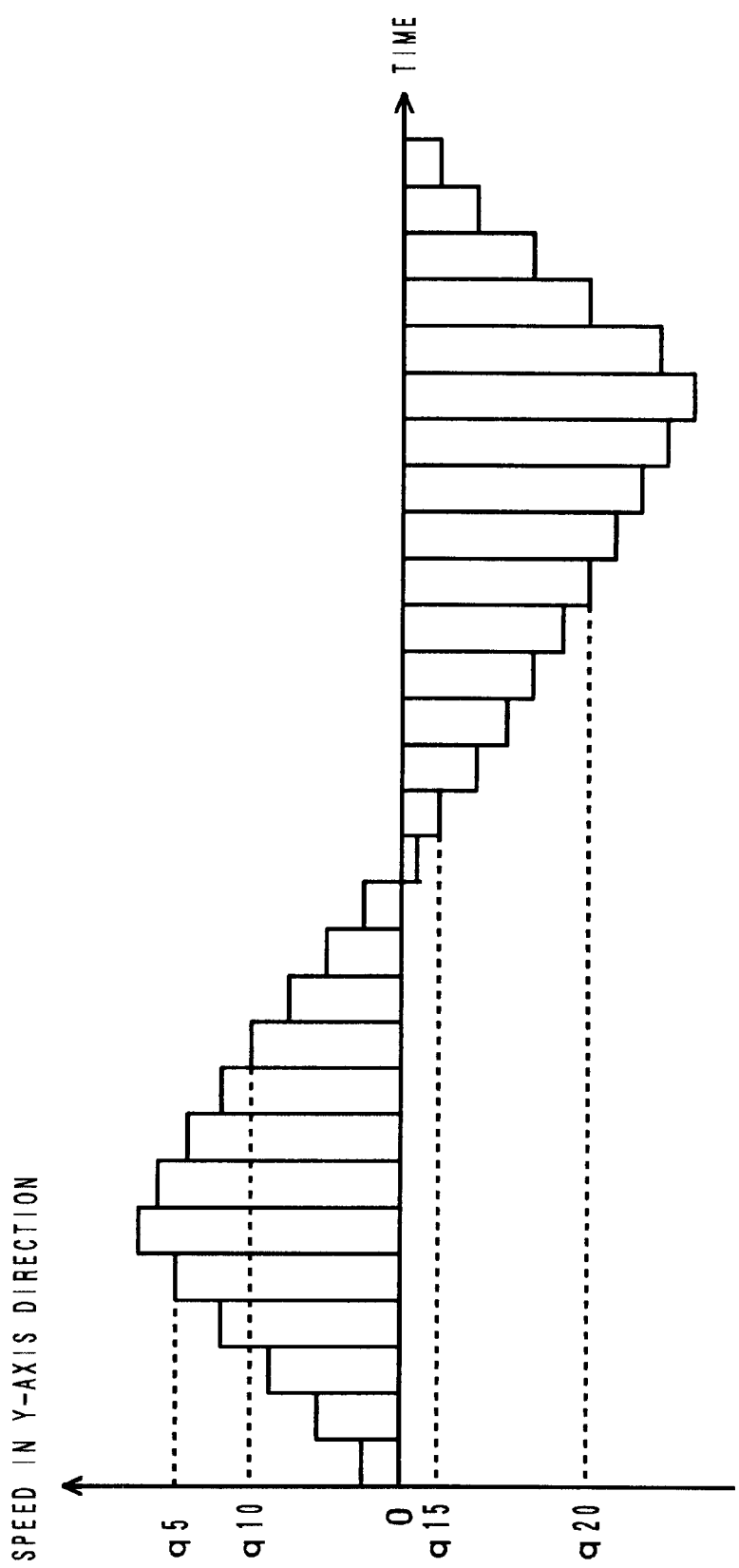
FIG. 8 is a diagram showing change of speed of Y axis in the embodiment in the same manner as in FIG. 2.

FIG. 8 shows change of speed of the Y axis in the above embodiment, in the same manner as in FIG. 2. Feed rate in individual sections Q0Q1, Q1Q2, Q2Q3, . . . , Q27Q28, Q28Q29, over the entire moving path including a start point and a stop point is shown as a bar graph divided into twenty nine value areas. Since the sequence of points outputted by the secondary interpolation processing forms a smooth curve, there is no point where feed rate in the Y axis direction changes abruptly. Indications q5, q10, q15, q20 on the vertical axis indicate speed in sections Q4Q5, Q9Q10, Q14Q15, Q19Q20, respectively.

As described above, when a machine such as a machine tool of each kind, a laser beam machine or a plasma machine is controlled by a controller according to the present invention, it is possible to reduce a path error to a minor one and smoothly change speed of a machining tool. This makes it further possible to improve machining accuracy and increase machining speed.

What is claimed is:

1. A controller for controlling a machine driven by a servomotor, the controller performing an interpolation for a motion path of a machining tool specified by a machining program to output a motion command for each axis of the machine, the controller comprising:

primary interpolation means for defining a plurality of primary interpolation points based on the specified motion path of the machining tool;

acceleration/deceleration control means for performing acceleration/deceleration control of speed based on the primary interpolation points defined by said primary interpolation means; and secondary interpolation means for defining secondary interpolation points on a smooth curve approximated by the primary interpolation points based on an output of the acceleration/deceleration control means and on the primary interpolation points defined by the primary interpolation means.

2. A controller according to claim 1, wherein said secondary interpolation means calculates a position of a secondary interpolation point on the smooth curve based on a polynomial of n-th degree which expresses said curve, where n is greater than 1.

3. A controller as recited in claim 1, wherein the smooth curve approximated by the primary interpolation points passes through the primary interpolation points.

4. A controller as recited in claim 1, wherein the smooth curve approximated by the primary interpolation points passes in the vicinity of the primary interpolation points.

5. A controller for controlling a machine driven by a servomotor, the controller performing an interpolation for a motion path of a machining tool specified by a machining program to output a motion command for each axis of the machine, the controller comprising:

primary interpolation means for defining a plurality of primary interpolation points based on the specified motion path of the machining tool;

secondary interpolation means for defining secondary interpolation points on a smooth curve approximated by the primary interpolation points based on the primary interpolation points created by the primary interpolation means;

acceleration/deceleration control means for performing acceleration/deceleration control of speed in a direction tangential to the smooth curve;

command analyzing means for analyzing the machining program and converting the machining program to data for the primary interpolation means; and an intermediate memory interposed between said primary interpolation means and the secondary interpolation means, wherein the primary interpolation means outputs data representing a position of a primary interpolation point on the specified motion path in each first sampling period based on the data resulting from conversion by the command analyzing means, the intermediate memory temporarily stores data outputted from said primary interpolation means, the acceleration/deceleration control means performs acceleration/deceleration control based on the data stored in said intermediate memory, and calculates speed in the direction tangential to said smooth curve in each second sampling period, and the secondary interpolation means defines the smooth curve based on an output from the acceleration/deceleration control means and the data stored in said intermediate memory, and outputs data expressing a position of a secondary interpolation point on the smooth curve in said each second sampling period.

6. A controller for controlling a machine driven by a servomotor, the controller performing an interpolation for a motion path of a machining tool specified by a machining program to output a motion command for each axis of the machine, the controller comprising:

a primary interpolation device defining a plurality of primary interpolation points based on the specified motion path of the machining tool;

an acceleration/deceleration control device performing acceleration/deceleration control of speed based on the primary interpolation points defined by said primary interpolation device; and a secondary interpolation device defining secondary interpolation points on a smooth curve approximated by the primary interpolation points based on an output of the acceleration/deceleration control device and the primary interpolation points defined by the primary interpolation device.

7. A controller according to claim 6, wherein the secondary interpolation device calculates a position of a secondary interpolation point on the smooth curve based on a polynomial of n-th degree which expresses the curve, wherein n is greater than 1.

8. A controller for controlling a machine driven by a servomotor, the controller performing an interpolation for a motion path of a machining tool specified by a machining program to output a motion command for each axis of the machine, the controller comprising:

a primary interpolation device defining a plurality of primary interpolation points based on the specified motion path of the machining tool;

a secondary interpolation device defining secondary interpolation points on a smooth curve approximated by the primary interpolation points based on the primary interpolation points created by the primary interpolation device;

an acceleration/deceleration control device performing acceleration/deceleration control of speed in a direction tangential to the smooth curve;

a command analyzing device analyzing the machining program and converting the machining program to data for the primary interpolation device; and an intermediate memory interposed between the primary interpolation device and the secondary interpolation device, wherein the primary interpolation device outputs data representing a position of a primary interpolation point on the specified motion path in each first sampling period based on the data resulting from conversion by the command analyzing device, the intermediate memory temporarily stores data outputted from the primary interpolation device, the acceleration/deceleration control device performs acceleration/deceleration control based on the data stored in the intermediate memory, and calculates speed in the direction tangential to the smooth curve in each second sampling period, and the secondary interpolation device defines the smooth curve based on an output from the acceleration/deceleration control device and the data stored in the intermediate memory, and outputs data expressing a position of a secondary interpolation point on the smooth curve in the each second sampling period.

9. A method of controlling a machine driven by a servomotor, the machine including a machining tool having a motion path specified by a machining program, comprising:

performing a primary interpolation of the motion path specified by the machining program to define a plurality of primary interpolation points;

performing acceleration/deceleration control of speed based on the primary interpolation points defined by said primary interpolation; and performing a secondary interpolation defining secondary interpolation points on a smooth curve approximated by the primary interpolation points based on an output of the acceleration/deceleration control and on the primary interpolation points defined by said primary interpolation.

10. A method as recited in claim 9, wherein performing the secondary interpolation comprises calculating a position of a secondary interpolation point on the smooth curve based on a polynomial of n-th degree which expresses the smooth curve, where n is greater than 1.

11. A method of controlling a machine driven by a servomotor, the machine including a machining tool having a motion path specified by a machining program, comprising:

analyzing the machining program and converting the machining program to data;

performing a primary interpolation of the data resulting from converting the machining program to data, the primary interpolation defining a plurality of primary interpolation points on the motion path specified by the machining program;

temporarily storing the data resulting from performing the primary interpolation;

performing acceleration/deceleration control based on the temporarily stored data, the acceleration/deceleration control calculating speed; and performing a secondary interpolation based on the temporarily stored data and the calculated speed, the secondary interpolation defining a smooth curve.

* * * * *